UNITED STATES PATENT OFFICE.

EDGAR B. HUTCHINS, JR., OF WAUKESHA, WISCONSIN, ASSIGNOR TO AMERICAN DEHYDRATING CO., OF WAUKESHA, WISCONSIN.

PRODUCING RAW DEHYDRATED IRISH POTATOES.

1,016,503.  Specification of Letters Patent.  Patented Feb. 6, 1912.

No Drawing.  Application filed June 7, 1909. Serial No. 500,577.

*To all whom it may concern:*

Be it known that I, EDGAR B. HUTCHINS, Jr., a citizen of the United States of America, and a resident of Waukesha, county of Waukesha, State of Wisconsin, have invented certain new and useful Improvements in Producing Raw Dehydrated Irish Potatoes, of which the following is a specification.

It has heretofore proved impracticable, as far as I am aware, to preserve Irish potatoes in salable form in an uncooked condition. This is owing to the fact that raw Irish potatoes oxidize very rapidly when exposed to the air and when so oxidized, turn black and are unsuitable for culinary purposes. Consequently it has been found impracticable to dry raw Irish potatoes by the methods which have ordinarily been used for drying other vegetables and fruits, that is, in a current of dry air or in the sun. It has however, long been a great desideratum to be able to transport potatoes in small bulk, treated in such a way that they can be restored to their original condition by the simple addition of water.

I am aware that Irish potatoes have heretofore been dried and have been put on the market in sealed packages, but in every instance I believe they have been steamed or cooked prior to the drying. My experiments have shown that when Irish potatoes which have been preserved in a raw dehydrated condition, are cooked, the flavor of such potatoes is practically indistinguishable from that of fresh potatoes. Moreover such raw dehydrated potatoes may be fried even more quickly than fresh raw potatoes; while the flavor of the product which is obtained by recooking the dehydrated potato which had been cooked previous to the drying, is quite inferior to that of the fresh article.

The object of this invention therefore, is to provide raw Irish potatoes packed in a dehydrated condition, so that they can be kept without change for a long period of time, and can then be restored to their original condition, so as to be indistinguishable from the fresh vegetable.

I am also aware that it has been proposed to dry sweet potatoes without a previous cooking, but sweet potatoes are not noticeably affected by oxidation during the process of removing water from them by a current of dry air. Consequently the problem is quite different from that which one faces when he attempts to dry raw Irish potatoes. Irish potatoes are rendered unsalable when they are dried by the methods which have been proposed for drying sweet potatoes on account of blackening due to oxidation in the air.

I have discovered that I can successfully dry or dehydrate raw Irish potatoes by the process to be described and I believe it is the only process which can be successfully used for the purpose.

The essential features for the process are: The use of a vacuum drier to extract the moisture from the potatoes, instead of subjecting them to a current of hot or dry air as has been done in the case of other vegetables and fruits. The exclusion of all air from the drying chamber by filling it with an inert gas before the potatoes are placed therein, and pumping out the gas to produce the vacuum after the potatoes have been introduced into the chamber.

In practicing this process, I proceed as follows:—The potatoes are peeled, washed and sliced. They are then placed on trays and immediately introduced into the drier, which is or may be any one of the known types of vacuum driers, and which has previously been filled with an inert gas such as nitrogen, carbonic acid gas or the like. As soon as the shelves of the drier are filled with the trays containing the sliced potatoes, the drier is closed as tightly as possible, and a suction pump connected thereto is set into operation to draw out the gas until the pressure in the drier is reduced to a suitable amount. Preferably, small quantities of the gas are admitted from time to time into the drier, for the purpose of displacing any air which may have gained entrance to the drier which ordinarily is not absolutely air tight. When the dehydration is complete, the potatoes are withdrawn and packed in sealed containers. Raw dehydrated Irish potatoes are not readily oxidized by the air when all or nearly all of their water has been withdrawn if they are kept dry.

Having thus described my invention, what I claim as new is:—

The method treating raw, Irish potatoes so that they can be kept indefinitely, which consists in peeling and slicing them and immediately thereafter placing them in a vacuum drier filled with an inert gas, drawing off said gas and, at the same time, the moisture of the potatoes, and packaging the latter before any moisture can have access to them.

Signed at Waukesha, this 21st day of May, A. D. 1909.

EDGAR B. HUTCHINS, Jr.

Witnesses:
WALTER R. FRAME,
FRANK M. WELNIK.

---

It is hereby certified that in Letters Patent No. 1,016,503, granted February 6, 1912, upon the application of Edgar B. Hutchins, Jr., of Waukesha, Wisconsin, for an improvement in "Producing Raw Dehydrated Irish Potatoes," an error appears in the printed specification requiring correction as follows: Page 2, line 6, after the word "method" insert the preposition *of;* and that the said Letters Patent should be read with this correction therein that the same may conform to the record of the case in the Patent Office.

Signed and sealed this 12th day of March, A. D., 1912.

[SEAL.]

E. B. MOORE,
*Commissioner of Patents.* potatoes are not readily oxidized by the air when all or nearly all of their water has been withdrawn if they are kept dry.

Having thus described my invention, what I claim as new is:—

The method treating raw, Irish potatoes so that they can be kept indefinitely, which consists in peeling and slicing them and immediately thereafter placing them in a vacuum drier filled with an inert gas, drawing off said gas and, at the same time, the moisture of the potatoes, and packaging the latter before any moisture can have access to them.

Signed at Waukesha, this 21st day of May, A. D. 1909.

EDGAR B. HUTCHINS, Jr.

Witnesses:
WALTER R. FRAME,
FRANK M. WELNIK.

---

Correction in Letters Patent No. 1,016,503.

It is hereby certified that in Letters Patent No. 1,016,503, granted February 6, 1912, upon the application of Edgar B. Hutchins, Jr., of Waukesha, Wisconsin, for an improvement in "Producing Raw Dehydrated Irish Potatoes," an error appears in the printed specification requiring correction as follows: Page 2, line 6, after the word "method" insert the preposition *of;* and that the said Letters Patent should be read with this correction therein that the same may conform to the record of the case in the Patent Office.

Signed and sealed this 12th day of March, A. D., 1912.

[SEAL.]

E. B. MOORE,
*Commissioner of Patents.*

It is hereby certified that in Letters Patent No. 1,016,503, granted February 6, 1912, upon the application of Edgar B. Hutchins, Jr., of Waukesha, Wisconsin, for an improvement in "Producing Raw Dehydrated Irish Potatoes," an error appears in the printed specification requiring correction as follows: Page 2, line 6, after the word "method" insert the preposition *of;* and that the said Letters Patent should be read with this correction therein that the same may conform to the record of the case in the Patent Office.

Signed and sealed this 12th day of March, A. D., 1912.

[SEAL.]

E. B. MOORE,
*Commissioner of Patents.*